United States Patent [19]

Borbely et al.

[11] 3,902,896

[45] Sept. 2, 1975

[54] CEMENTATION OF METALS FROM ACID SOLUTIONS

[75] Inventors: Gyula J. Borbely, Copper Cliff; Leander E. Cupp, Port Colborne; Brian Martin, Copper Cliff, all of Canada

[73] Assignee: The International Nickel Company, Inc., New York, N.Y.

[22] Filed: May 22, 1974

[21] Appl. No.: 472,184

[52] U.S. Cl. .............. 75/109; 75/117; 75/118; 75/121
[51] Int. Cl. .............................. C22b 15/12
[58] Field of Search ............ 75/109, 117, 118, 121, 75/.5 A, 108

[56] References Cited
UNITED STATES PATENTS

| | | | |
|---|---|---|---|
| 1,592,307 | 7/1926 | Lienhardt | 75/109 X |
| 1,624,172 | 4/1927 | Levy | 75/109 X |
| 1,703,763 | 2/1929 | Dietzsch | 75/101 R |
| 2,576,314 | 11/1951 | Forward | 75/103 UX |
| 2,687,953 | 8/1954 | Kenny et al. | 75/117 X |
| 2,693,404 | 11/1954 | Mackiw | 75/117 X |
| 2,727,818 | 12/1955 | Kenny et al. | 75/117 X |
| 3,117,000 | 1/1964 | Schlain et al. | 75/109 |

Primary Examiner—G. Ozaki
Attorney, Agent, or Firm—Frank J. Mulligan, Jr.; Ewan C. MacQueen

[57] ABSTRACT

Discloses the use of soluble thiosulfate in aqueous acidic solutions to aid the cementation of metals from solution. The invention is particularly useful in the recovery of copper, silver, gold and platinum group metals from aqueous acidic solutions.

11 Claims, No Drawings

CEMENTATION OF METALS FROM ACID SOLUTIONS

The present invention relates to the recovery of copper, silver, gold and platinum group metals from solution, and more particularly to the cementation from acid solutions.

It is frequently desired to remove copper and other valuable metals from process solutions to produce a metal concentrate for further treatment and/or to purify the process solution. Copper ores are, for example, sometimes heap leached with sulfuric acid to provide a comparatively dilute pregnant solution, and copper is advantageously recovered from such solutions by cementation. As another example, nickel process solutions that contain undesirable amounts of copper can be treated with particulate metallic nickel to cement the copper from solution.

Cementation is, to a large extent, a surface phenomenon in which copper or other valuable metals in solution are, by a metathesis reaction, deposited on a particulate base metal higher in the electromotive series. As cementation proceeds, the particulate base metal is coated with the valuable metal and the rate of cementation subsides. If and when the entire base metal is coated with copper or other metal the cementation reaction comes to a halt. In order to minimize the slowing down or the complete termination of the cementation reaction, the suspension of particulate base metal in the pregnant solution is agitated to remove the copper coating continuously from the particulate base metal thereby exposing fresh surfaces upon which the reaction can proceed.

Full utilization of the particulate base metal is important from the standpoints of base metal consumption and subsequent concentrate treatment. If the cementation reaction comes to a halt before substantially all the base metal is consumed, additional base metal must be added to the solution increasing the overall costs of the process. When the base metal is incompletely utilized the cement copper or other metal must eventually be separated from the base metal adding to the cost of recovery.

It has now been discovered that cementation of metal values dissolved in acidic aqueous solutions on particulate base metals can be improved by incorporating small but effective amounts of a special additive to the acidic aqueous solution to minimize termination of the cementation reaction before the particulate base metal is consumed by the reaction.

Generally speaking, the present invention involves an improved process for recovering metal values dissolved in acidic aqueous solutions by cementation on a particulate base metal higher in the electromotive series than is the dissolved metal or metals. The improvement comprises adding a water soluble thiosulfate to the acidic aqueous solution in small but effective amounts to produce an exfoliative metal deposit on the particulate base metal so that the metal deposit readily flakes off the particulate base metal exposing fresh surfaces for the cementation reaction to continue.

Copper-containing aqueous solutions derived from any source can be treated by the process in accordance with the present invention. For example, pregnant solutions produced by leaching cupriferous ores can be treated to recover copper by the improved cementation process of the present invention. Other process solutions, such as nickel-containing electrolytes for electrowinning or electrorefining nickel, can be treated for copper removal by the technique present invention by cementation on nickel.

The process in accordance with the present invention can be employed to treat a wide range of copper-containing process solutions and the invention will be described in conjunction with the treatment of nickel process solutions.

Nickel process solutions that can be treated by the process in accordance with the present invention contain nickel in amounts of up to about 100 grams per liter (gpl) or more, up to about 10 gpl copper, up to about 230 gpl sulfate ions, up to about 100 gpl chloride ions, up to about 100 gpl sodium and up to about 30 gpl boric acid. The pH value of the nickel process solution can vary over wide limits but the pH value of the solution is advantageously maintained between about 2 and 5.

The conditions of cementation are not critical. The temperature of the process solution can vary from ambient temperatures to above the solution's boiling point at corresponding pressures. Although the kinetics of the cementation reaction are improved by increasing temperatures, the advantages gained by the improved kinetics are soon outweighed by the additional costs required for pressure equipment once the boiling point of the solution is exceeded. The advantages of improved kinetics without additional capital costs are best realized by conducting the process at temperatures between about 25°C. and 100°C.

Atmosphere control is not essential but the atmosphere should not be so oxidizing that the cemented copper is oxidized and redissolved. Under ordinary conditions special precautions need not be taken; however, if excessive agitation is employed the cementation process should be conducted under a neutral or slightly reducing atmosphere. Maintenance of a neutral to slightly reducing atmosphere can be achieved by conducting the cementation process in a closed vessel and by excluding air or other free-oxygen-containing gases from the vessel or introducing neutral gases such as nitrogen or reducing gases, such as hydrogen or carbon monoxide, into the vessel.

Cementation is conducted with sufficient agitation to maintain the particulate base metal in suspension. Agitation such as prevailing in a mixer tank insures good liquid-solid contact so that the cementation reaction between the dissolved copper values and the particulate base metal can proceed at commercially attractive rates. Not only does the agitation insure good liquid-solid contact between the copper-containing solution and the particulate base metal but such agitation provides interparticle collisions which provide effective abrading action, particularly for the exfoliative copper deposit produced in accordance with the present invention. The cementation reaction may also be carried out in a liquid fluid bed reactor, pachuca tank, packed column or other type of contactor. The type of reactor is not critical to this invention.

Any base metal that stands higher in the electromotive series than does copper usually can be used to cement copper from solution. Examples of base metals that can be employed include aluminum, zinc, cobalt, iron and nickel. When treating nickel process solutions it is particularly advantageous to use particulate nickel. For example, nickel oxide sinter that has been reduced substantially to metal can be employed to cement copper from nickel process solutions. Advantageously, the nickel oxide sinter is reduced at low temperature, e.g., below about 600°C. in order to provide a kinetically active metal. The nickel oxide does not have to be completely reduced to the metallic state, and, in most instances, nickel oxide that is about 90 percent metallized can be used.

As those skilled in the art will appreciate, the particulate metal used to cement another metal out of aqueous solution should be compatible with the anions in solution. For example, even though lead is above both copper and silver in the electromotive series (for example, as set forth on page 1740 of Handbook of Chemistry and Physics, 44th Edition Chemical Rubber Publishing Company), lead would be a poor choice for cementing copper out of a sulfate solution because of the formation of sparsely soluble lead sulfate and again a poor choice for the cementation of silver out of a fluoride containing solution owing to the formation of sparsely soluble lead fluoride. Zinc, on the other hand woudl be a good choice in both instances. As another example, difficulties may arise when using iron to cement copper out of solution if the pH of the copper solution is too high. Hydrolytic precipitation of the iron from the aqueous medium can occur under those conditions.

Another factor which those skilled in the art will appreciate is that the metal added for cementation purposes should not be too active. For example, most of the metals above about aluminum in the electromotive series will react not only to cement metal from aqueous solution but also with water to form gaseous hydrogen. In the usual case, this production of hydrogen constitutes a waste of cementing metal and thus an increase in reagent cost. Hydrogen can also be produced in substantial quantities using zinc, aluminum, iron etc., as the cementing reagent if the aqueous solution is too acidic. In order to minimize hydrogen production when using zinc, aluminum, iron etc., as the cementing reagent, the pH of the aqueous solution should be controlled so that it is no less than about 1.

Another factor that is important in controlling the cementation reaction is the particle size of the base metal. The rate of cementation is to a great extent determined by the surface area of the base metal with the rate of cementation being a direct function of surface area. Smaller particle size not only increases the rate of cementation but the problems associated with maintaining the base metal in suspension are also minimized. From the standpoint of cementation kinetics, a particle size distribution of 100 percent minus 20 mesh, Tyler Screen Size, is advantageously employed. Most advantageously, a particle size distribution between about 35 percent minus 200 mesh and about 10 percent plus 60 mesh are employed to maximize the cementation reaction and to avoid the problems associated with the handling of finely divided materials.

Some base metals for use in cementation may become slightly oxidized prior to use and do not react rapidly or completely during cementation, particularly when cementing from solutions having pH between about 3.5 and 7. In this instance an acid wash of the base metal prior to use may be advantageous.

An important aspect of the present invention is the production of an exfoliative cement metal deposit on the particulate base metal so that the deposit is easily dislodged from the base metal exposing fresh base metal surfaces on which the cementation reaction can continue. Production of an exfoliative cement metal deposit is obtained by incorporating at least one water soluble thiosulfate in small but effective amounts in solution. Examples of water soluble thiosulfate are sodium thiosulfate, ammonium thiosulfate, magnesium thiosulfate, potassium thiosulfate and lithium thiosulfate. Sodium thiosulfate is advantageously employed because of its ready availability and low cost.

The water soluble thiosulfate is added to the solutions in small but effective amounts to produce an exfoliative metal deposit. The amount of water soluble thiosulfate added to the metal-containing process solutions can vary over wide limits but, in most instances, it is advantageous to add the thiosulfate to the process solution in amounts up to about 10 parts of sulfur equivalent thiosulfate (i.e., sulfur present in thiosulfate form) to 100 parts of metal to be cemented from solutions. Ordinarily, a minimum of about 0.1 part by weight of thiosulfate sulfur is used per 100 parts by weight of cementable metal and advantageously in amounts between about 0.2 part and 3.0 parts sulfur equivalent thiosulfate are used. Thiosulfate additions within the foregoing ranges insure exfoliative metal deposits on the particulate base metal while minimizing the costs associated with the reagent.

Another important aspect of the present invention is the concurrent effective removal of trace elements, such as lead, arsenic, antimony, bismuth and selenium, when treating nickel process solutions with nickel and thiosulfate to remove copper. Trace amounts of soluble precious metals are also effectively recovered with the precipitated copper.

EXAMPLE I

A nickel process solution containing 1.92 gpl of copper and having a pH between about 7.5 and 4 was fed to a mixer tank and maintained at a temperature of 60°C. Commercially available particulate nickel, about 92 percent reduced and obtained by hydrogen reduction of nickel oxide sinter in a fluid bed reactor, was added to the process solution in an amount equivalent to three times the stoichiometric amount required to cement the copper. Sodium thiosulfate was added to the nickel process solution in an amount equivalent to 0.012 gpl, i.e., an amount such that the ratio of sulfur in the thiosulfate to the copper in solution was about 0.00257:1. Cementation was conducted for about one hour and samples were taken at intervals with the redox potential being measured and the sample quantitatively analyzed for copper, arsenic and lead. The results are reported in Table I.

TABLE I

| Cementation Potential EMF in m.v. | | Cu g.p.l. | % | As g.p.l. | % | Pb g.p.l. | % |
|---|---|---|---|---|---|---|---|
| Tk. effluent | − 150 (head sample) | 1.92 | 100 | .0076 | 100 | .0033 | 100 |
| Cementation | − 200 | .82 | 42.7 | .0076 | 100 | .0033 | 100 |
| " | − 250 | .23 | 12.0 | .0075 | 99 | .0032 | 97 |
| " | − 300 | .050 | 2.6 | .0075 | 99 | .0031 | 94 |
| " | − 350 | .015 | 0.78 | .0067 | 88 | .0030 | 91 |

TABLE I—Continued

| Cementation Potential EMF in m.v. | Cu g.p.l. | % | As g.p.l. | % | Pb g.p.l. | % |
|---|---|---|---|---|---|---|
| " −400 | .0025 | 0.13 | .0025 | 33 | .0024 | 73 |
| " −430 | .00058 | 0.03 | .00074 | 0.97 | .00026 | 7.9 |
| % Removal | | 99.97 | | 99.03 | | 92.1 |

EXAMPLE II

This example confirms the efficiency of thiosulfate additions in producing exfoliative copper deposits and the greater efficiency in the utilization of the nickel metal.

Three samples of a nickel process solution containing 0.5 gpl copper and having a pH value of 4.0 were fed to a mixer tank and were maintained at a temperature of 60°C. Reduced particulate nickel, activated by a sulfuric acid wash and having a particle size distribution given in Table II, was added to the nickel process solutions in stoichiometric amount of metallic nickel equivalent to the dissolved copper content. One solution was treated without any thiosulfate addition, and different amounts of sodium thiosulfate were added to the other samples. Sodium thiosulfate ("hypo") was added to one sample in an amount equivalent to 0.0054 gpl and in an amount equivalent to 0.014 gpl in the other sample (i.e., sulfur in sodium thiosulfate to copper in solution ratios of 0.00274 and 0.0071, respectively).

Upon completion of the cementation reaction, the cement copper was chemically and physically analyzed and the results are reported in Table II. In the tests in which sodium thiosulfate was used, at least about 99 percent of the copper in solution was cemented whereas in the absence of thiosulfate only about 32 percent of the copper was cemented.

Referring to the results reported in Table II, it will be noted from the particle size distribution data (based upon Tyler screen sizes) that in the absence of thiosulfate additions the mean particle size of the cement product was larger than the mean particle size of the reduced nickel oxide sinter particles. The increase in the mean particle size suggests that an adherent copper deposit was formed on the nickel with a concomitant increase in the size of the particles, and this is confirmed not only by the chemical analysis which shows that the particulate product still contains almost 68% nickel but also by visual observation under the microscope. With thiosulfate additions, on the other hand, the mean particle size of the product was substantially reduced suggesting that an exfoliation deposit was formed allowing most of the particulate nickel to be consumed by the cementation reaction. The results also indicate that with thiosulfate additions above about 0.0054 gpl, little is gained by way of efficient utilization of the particulate nickel.

TABLE II $H_2SO_4$ Activated NiO-95 - Cementation & Effect of Sulphur
% S as $Na_2S_2O_3$ added during cementation Distribution (% by weight)

| Mesh | NiO-95 Activated | None | 0.274 | 0.71 |
|---|---|---|---|---|
| +35 | 8.2 | 25.0 | 4.0 | 1.1 |
| +60 | 53.0 | 61.6 | 8.7 | 4.3 |
| +100 | 31.9 | 9.7 | 4.7 | 3.2 |
| +150 | 2.0 | 1.4 | 5.3 | 2.2 |
| −150 | 4.9 | 2.8 | 77.3 | 89.2 |
| Assay (% by weight) | | | | |
| S | 0.02 | 0.048 | 0.17 | 0.33 |
| Ni | 95 | 67.85 | 12.20* | 10.30* |
| Cu | 0.3 | 27.68 | 82.17 | 82.27 |
| Copper (% by weight) | 32.0 | 99.3 | 99.9 | |

* = nickel is present mainly as nickel oxide

EXAMPLE III

A continuous copper cementation test was carried out with and without thiosulphate addition to demonstrate the effect of thiosulphate on continuous copper cementation from a nickel solution.

The experiment was conducted in a 100 cubic foot mixer tank at 10 per cent solid density of reduced particulate nickel while treating a process solution flow of 200 cubic feet per hour with a soluble copper content of 0.3 gpl Cu.

For the first 20 hours there was no thiosulphate addition and copper removal was negligible. Sodium thiosulphate addition was then introduced at a rate of 0.012 grams per litre of process solution. Within 5 minutes following the thiosulphate addition, there was a decrease in the solution copper content from 0.3 gpl to 0.005 gpl and the copper content of the solution remained at these low levels afterward.

The results are set forth in Table III.

TABLE III

| | Elapsed Time Hours | Feed Liquor Cu gpl | Mixer Tank Effluent Cu gpl | EMF mV | pH |
|---|---|---|---|---|---|
| (a) | 20.0 | 0.3 | 0.3 | +120 | 2.6 |
| (b) | 0.1 | 0.3 | 0.005 | −200 | 2.6 |
| (b) | 1.0 | 0.3 | 0.002 | −400 | 2.6 |
| (b) | 11.0 | 0.3 | 0.003 | −400 | 2.7 |

(a) Without thiosulphate
(b) With thiosulphate

EXAMPLE IV

A better utilization of the particulate nickel can be accomplished by using a multi-stage counter current cementation system. In practice, a two-stage counter current system can be used with each stage comprising a mixer tank and a settler tank. The settler underflow is constantly recirculated to revert the settled out solids to their corresponding mixer tanks. Thiosulphate is fed to the first mixer tank and the particulate nickel to the last mixer tank. A bleed off from the first stage recirculating line is used for removal of cemented metal concentrate.

A similar bleed off from the second stage is used to divert the solids from second stage to the first stage mixer tank, counter to the direction of solution flow. In this manner, the system produces a highly purified process solution and an acceptable grade cemented copper concentrate as a byproduct as shown by the data set forth in Table IV.

TABLE IV

|  | Solution Analyses Cu gpl | Copper Removal % |  | Analyses Cu % | Ni % |
|---|---|---|---|---|---|
| * Feed solution | 0.38 | 0 |  |  |  |
| 1st Stage Effluent | 0.04 | 89.5 | 1st Stage Cu cement = | 73.0 | 7.0 |
| 2nd Stage Effluent | 0.004 | 99.0 | 2nd Stage Mix Tank Solids = | 30.3 | 53.8 |
| Filter Press | 0.0003 | 99.92 | Starting Ni Metal = | 0.22 | 95.4 |

* Thiosulphate addition 1.0 part sulfur equivalent thiosulphate to 100 parts copper in solution.

EXAMPLE V

This example confirms the efficiency of thiosulphate addition in producing exfoliated copper deposit by cementation, from process solutions, other than nickel, at ambient temperatures and when the particulate base metal is iron.

Two samples of copper sulphate solution containing 5 gpl copper and having a pH value of 2.5 were fed to a mixer tank. Acid activated electrolytic iron powder of 100 mesh size was added to the copper solution in a stoichiometric amount equivalent to the dissolved copper content. One solution was treated without any thiosulphate addition, and sodium thiosulphate was added to the other in an amount equivalent to 0.5 part sulphur per 100 parts of copper to be cemented.

Upon completion of the cementation reaction the copper cement was removed and analyzed; the results are set forth in Table V.

TABLE V

|  | Composition | |
|---|---|---|
| Copper Cement | Cu % (by Weight) | Fe %(by Weight) |
| Without thiosulphate | 20.82 | 78.00 |
| With thiosulphate | 85.50 | 0.88 |

With the thiosulphate addition, the iron was essentially all consumed, whereas without the thiosulphate the cementation reaction had virtually ceased with only part of the iron reacted.

The present invention is also operative to produce exfoliative cement metal deposits from aqueous acidic solutions containing various cementable metals to which sulfur in the form of thiosulphate ion is added in an amount of 1 part of sulfur per each 100 parts of cementable metal as shown in Table VI.

TABLE VI

| Example No. | Cementable Metal | Metal Powder | Anion in Solution |
|---|---|---|---|
| VI | Ag | Zn | Fluoride |
| VII | Ag | Al | Sulfate |
| VIII | Au | Fe | Chloride |
| IX | Pt group metals | Zn | Chloride |
| X | Hg | Fe | Nitrate |
| XI | Cu | Zn | Sulfate |
| XII | Cu | Al | Sulfate |

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. In a process for cementing a metal from an acidic, aqueous solution on a particulate base metal that is higher in the electromotive series than is the metal to be recovered, said particulate base metal being insufficiently active to react with water to produce significant quantities of hydrogen and said aqueous solution being insufficiently acidic to react with less active particulate base metal to produce significant amounts of hydrogen, the improvement which comprises adding water-soluble thiosulfate to said acidic aqueous solution, in small but effective amounts up to about 10 parts by weight of sulfur as thiosulfate per each 100 parts by weight of metal to be cemented, prior to or during cementation so that the cemented metal readily flakes off the particulate base metal exposing fresh surfaces for the cementation reaction to continue.

2. A process as in claim 1 wherein at least 0.1 part by weight of sulfur as thiosulfate is added per each 100 parts by weight of metal to be cemented.

3. A process as in claim 1 carried out in two or more stages wherein the particulate base metal is caused to move from one stage to another countercurrent to the flow of acidic, aqueous solution to provide as a product of the final stage acidic, aqueous solution essentially free of cementable metal and as a product of the first stage a cement metal rich in cementable metal.

4. A process as in claim 1 wherein the metal to be cemented is copper.

5. A process as in claim 4 wherein the particulate base metal is selected from the group of aluminum, zinc, iron, cobalt and nickel.

6. A process as in claim 5 wherein the particulate base metal is iron.

7. A process as in claim 4 wherein metal from the group of gold, silver and platinum group metals is cemented along with copper.

8. A process as in claim 1 wherein the particulate base metal is given an acid wash prior to being placed in contact with said acidic, aqueous solution.

9. A process as in claim 4 wherein the copper is cemented from a nickel process solution using nickel as the particulate base metal.

10. A process as in claim 9 wherein elements of the group of lead, arsenic, bismuth, antimony and selenium are removed from said nickel process solution along with copper.

11. A process as in claim 1 wherein the metal to be cemented is from the group of gold, silver, copper and the platinum-group metals.

* * * * *